United States Patent [19]

Johnson

[11] 3,788,629

[45] Jan. 29, 1974

[54] VEHICLE TRACTION BAR

[75] Inventor: Robert E. Johnson, Los Angeles, Calif.

[73] Assignee: Whittaker Corporation, Los Angeles, Calif.

[22] Filed: Aug. 21, 1972

[21] Appl. No.: 282,438

[52] U.S. Cl. .................................. 267/66, 180/71
[51] Int. Cl. ............................................. B60g 25/60
[58] Field of Search ....... 267/66, 67, 48; 180/71, 74

[56] References Cited
UNITED STATES PATENTS

| 3,191,711 | 6/1965 | Conner ................................ 267/66 |
| 3,601,385 | 8/1971 | Senter et al. ......................... 267/48 |
| 3,444,947 | 5/1969 | Stocks et al. ......................... 180/71 |

*Primary Examiner*—James B. Marbert

[57] ABSTRACT

A traction bar for use in stiffening the rear suspension systems of vehicles which utilize coil springs as part of their suspension system with a pair of traction bars being used in place of the lower control arms. Each traction bar comprises a rigid, elongated control arm and a frame member, with the control arm pivotally connected at its normally rearward end to the frame member. The latter is fixedly connected to a vehicle's rear axle housing while the control arm extends forwardly of the frame for pivotal connection at its forward end to a forward, lower control arm bracket. The frame is provided with vertically oriented adjusting bolts for engagement with the control arm intermediate the ends of the latter. For vehicle race use, the adjusting bolts are locked against the control arm to prevent it from moving vertically relative to the frame and, for vehicle street use, the adjusting belts are backed off from contact with the control arm to permit vertical movement of the latter with respect to the frame.

13 Claims, 6 Drawing Figures

VEHICLE TRACTION BAR

BACKGROUND OF THE INVENTION

This invention relates to apparatus for changing the rear suspension of an automobile and, more particularly, to traction bars for stiffening vehicle rear ends which employ coil springs as part of their suspension systems.

Stiffening of vehicle rear ends is required in drag racing to maintain the rear end of the vehicle in contact with the ground to maximize friction between the wheels and the ground to, in turn, obtain maximum acceleration. If such stiffening is not employed, the downward force of the vehicle on the springs during acceleration causes the rear of the car to bounce with the result that the wheels only intermittently contact the ground. In addition to a loss in acceleration, there is a substantial decrease in the control exercizeable by the driver over the direction taken by the vehicle.

A method for stiffening rear ends employing leaf springs is described in U.S. Pat. No. 3,601,385, issued Aug. 24, 1971 to the instant inventors. However, that invention cannot be used with coil springs.

Heretofore, rear ends employing coil springs have been stiffened in a number of different ways — none of which has been satisfactory, particularly for drag enthusiasts who also use their cars for ordinary street use. One method has been to reinforce or strengthen the lower control arms themselves in order to make them stiffer. The disadvantage associated with this method is that it does not provide any adjustability for street/track use. In fact, it really only strengthens the lower control arms to accept the the increased loads developed by a car which is set up for drag use.

A second method, which is often used in conjunction with the previous method, is to remove the rubber bushings at the ends of the lower control arms and to replace them with solid or non-cushioning pivot points. This combination stops some wheel-hop, but also does not provide adjustability. So called "ladder bars" have been used in place of the lower control arms. However, these units also do not provide adjustability since they are solid units which are welded to the rear axle. This prevents their use on "street" cars since the rear axle housing and suspension are damaged by such use. Attempts have also been made to modify the upper control arms without significant success in preventing wheel-hop.

SUMMARY OF THE INVENTION

This invention is embodied in a traction bar which includes a rigid, elongated arm having pivot points at each end with the leading pivot point available for connection to a vehicle body forward of the rear axle. The rear pivot point of the elongated arm is pivotally connected to a sleeve-like member which is fixedly connected to the rear axle. This connection is such that it normally permits vertical pivotal movement of the elongated arm with respect to the sleeve-like member between stops located in the sleeve-like member. The stops are adjustable to prevent the aforementioned pivotal movement, e.g., when drag racing, or to provide varying degrees of pivotal movement of the bar with respect to the sleeve-like member, e.g., when using a vehicle for street use. A pair of the foregoing devices are used on each vehicle in place of the lower control arms by preferably connecting these devices to the existing lower control arm brackets.

The primary advantage of the herein-described traction bar is that it provides adjustability. The aforementioned adjustability permits these traction bars to be used on vehicles which are normally used for both track and street purposes without removing the traction bars when the vehicle is to be adapted for street use. This adjustability also permits each side of a vehicle to be independently adjusted so that imbalance in a vehicle's suspension or weight can be compensated for by adjustment of the traction bars.

In addition to the aforementioned adjustability advantage, these traction bars also provide rigid bar construction and solid bushings to provide improved wheel/road contact.

DESCRIPTION OF THE PREFERRED EMBODIMENT

The term "normally", when used hereinafter to refer to the position of features of the herein-described traction bar, refers to the traction bar when in operating position on a vehicle.

Figure 1:
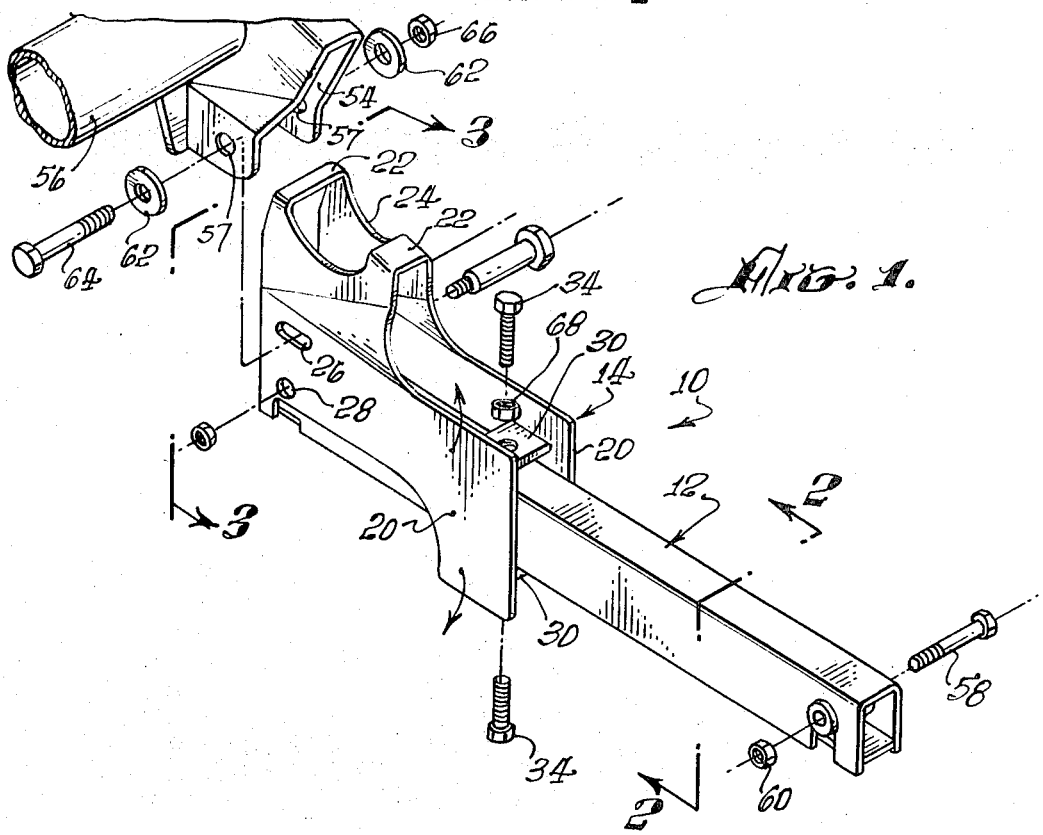
FIG. 1 is a perspective view of the traction bar of this invention alone.
Figure 2:
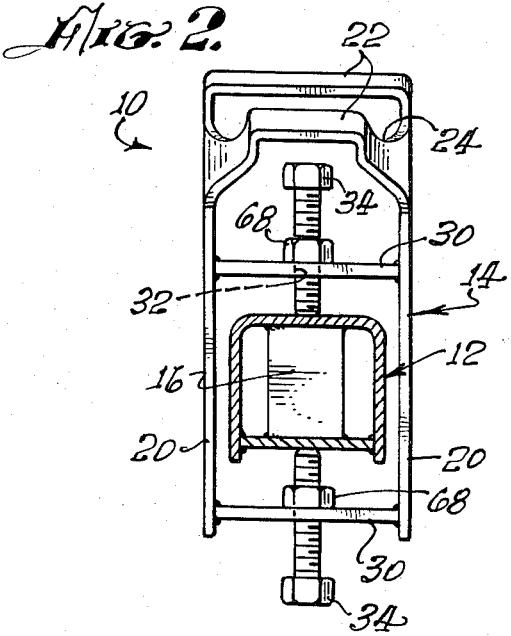
FIG. 2 is a sectional view taken along the line 2—2 of FIG. 1.
Figure 3:
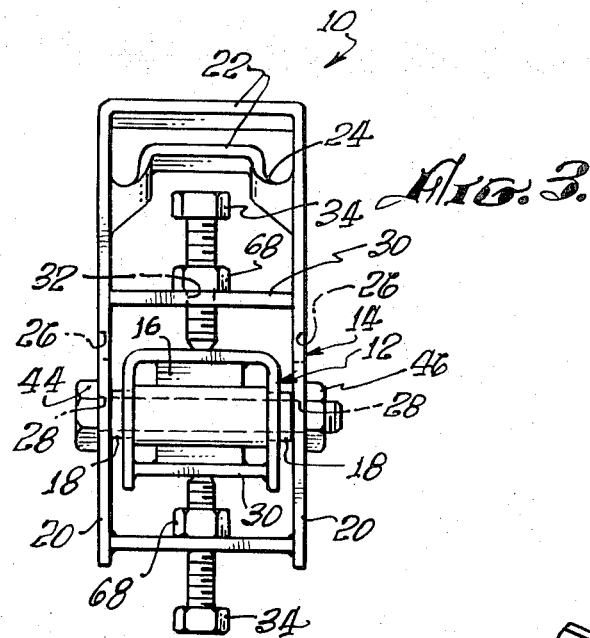
FIG. 3 is a rear view of the control arm and frame of the traction bar of this invention taken along the line 3—3 of FIG. 1.

Referring now to FIG. 1-3, the numeral 10 designates a traction bar of this invention which comprises an elongated control arm 12 and a sleeve-like frame or bracket 14. The control arm 12 is a rigid bar which may be formed from, e.g., steel and, preferably, is of tubular construction to provide strength with minimum weight. To ensure that the control arm 12 has sufficient strength to resist compressive loads applied transaxially by the frame member 14, the control arm 12 may be reinforced internally by, for example, extending a generally vertically oriented rib 16 between the upper and lower interior surfaces of the control arm 12 at the point where the latter surfaces are compressed by bolts adjustably carried on the frame 14 as will be hereinafter described.

The control arm 12 is preferably provided with a pair of solid bushings 18 which are affixed to the control arm 12 adjacent each end thereof to extend transaxially through the arm. The bushings 18 may be affixed to the control arm 12 by, e.g., welding.

The frame 14 comprises a pair of plates 20 which are maintained in spaced relation, e.g., by spacers 22 welded to each of the plates 20. The normally upper surface of each plate 20, is preferably provided with a normally upwardly-opening arcuate or concave surface 24 configured to receive and partially circumvent a rear axle housing when in operating position on a vehicle. The arcuate surface 24 is located adjacent to the normally rearward end of the frame 14. A pair of holes or apertures 26,28 are formed in each plate 20 generally above and below one another and below the arcuate surface 24 so that there is provided an upper and a lower pair of aligned holes 26,26 and 28,28, respectively.

The frame 14 is provided with adjustment means comprising a pair of spaced, metal limit bars 30 normally generally horizontally oriented and extending between and affixed, e.g., by welding, to the plates 20 adjacent to the normally forward end of the frame 14. Each limit bar 30 is provided with a threaded aperture 32 preferably positioned to be in alignment with the other aperture 32 and sized to threadably receive adjusting bolts 34. The vertical spacing of the limit bars 30 is determined by the expected amount of vertical movement of the control arm 12 relative to the frame 14 when the traction bar 10 is adapted for street use to permit such relative movement of the control arm 12 without significant contact with the limit bars 30.

Figure 4:
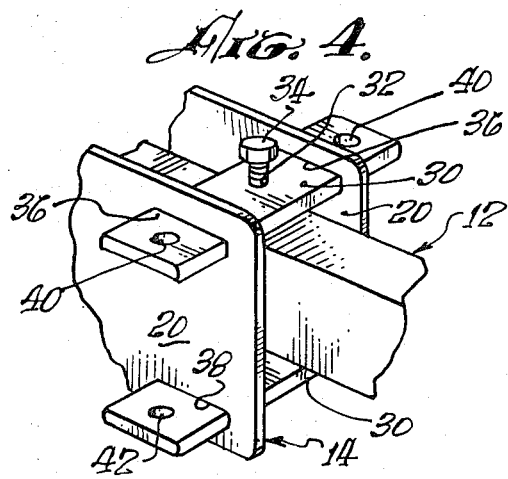
FIG. 4 is a partial perspective view of the forward end of the frame portion of the herein-described traction bar showing an alternative form.

In lieu of the fixed limit bars 30, aligned slots 36, 38 may be formed in the plates 20 to slidably receive the limit bars 30 as shown in FIG. 4. Additionally, aligned holes 40,42 may be formed in the limit bars 30 to receive pins, e.g., cotter pins, to releasably retain the limit bars 30 in position in the frame 14 when a vehicle is used for racing. When the vehicle is to be used for street purposes, the limit bars 30 may be removed or bolts 34 may be backed off to permit unrestricted or less restricted vertical movement, respectively, of the control arm 12 relative to the frame 14.

Attachment of the frame 14 to the control arm 12 may be made by extending a bolt 44 through the aligned, normally lower pair of holes 28 in the plates 20 and through the bushing 18 in the normally rear end of the control arm 12 so that the bolt 44 is slidably received by the aligned holes 28 and bushing 18 and so that the control arm 12 extends forwardly through the frame 14 between the limit bars 30 and beyond. A locknut 46 is threaded onto the bolt 44 and tightened to maintain the connection between the frame 14 and control arm 12 and yet permit vertical pivotal movement of the frame 14 about the bolt 44 relative to the control arm 12.

Figure 5:
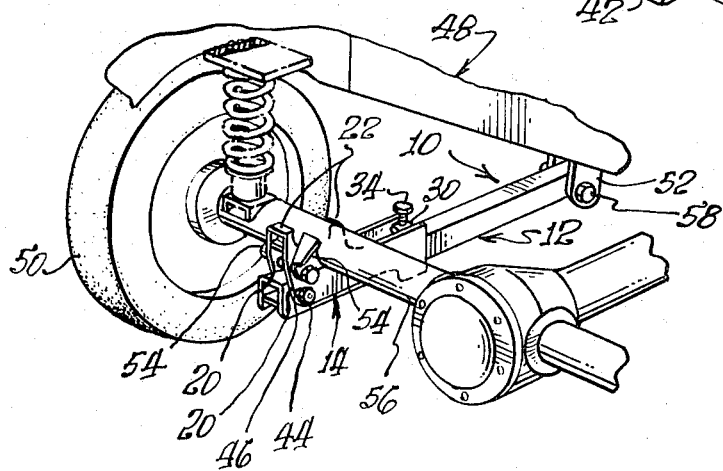
FIG. 5 is a perspective view of the traction bar of this invention showing a portion of the rear end of a vehicle with the traction bar installed as a part of the latter's suspension system.

Installation and operation of the traction bar 10 will now be described with reference to FIG. 5 which shows a partial section of a vehicle rear end including a coil spring (in dotted outline) as part of that vehicle's rear suspension system.

Before connecting the traction bar 10 to a vehicle 48, the rear of the vehicle is raised so that the tires 50 are about 12 inches off the ground. Connection of the traction bar 10 to the vehicle 48 is preferably accomplished by connecting the forward end of the control arm 12 to a forward, lower control arm bracket 52 (after the lower control arm has been removed) which is attached to the vehicle body 48 and by connecting the frame 14 to a rear, lower control arm bracket 54 which depends from a rear axle housing 56. The forward end of the control arm 12 is pivotally connected to the forward, lower control arm mounting bracket 52 by extending a forward mounting bolt 58 through a hole (not shown) in this bracket 52 and through the forward bushing 18 in the control arm 12 and tightening a threaded nut 60 thereon to permit pivotal movement of the control arm 12 with respect to the forward, lower control arm bracket 52.

The frame 14 is connected to the rear, lower control arm bracket 54 by first fitting the frame 14 into the latter bracket 54 and forcing the arcuate surface 24 into abutting contact with the lower surface of the axle housing 56. In this position, the normally upper aligned holes 26 in the frame plates 20 will be in alignment with aligned holes 57 in the rear, lower control arm bracket 54. Toothed washers 62 are placed against the outer sides of the rear bracket 54 with the teething in contact with the bracket 54. A rear mounting bolt 64 is then extended through the toothed washers 62, the rear bracket 54, and the upper holes 26 in the frame 14. A nut 66 is threaded onto the bolt 64 but is not tightened at this time as described hereafter.

Both traction bars 10 are installed as described and then the vehicle 48 is next lowered to the ground so that it sits on all tires 50. The adjusting bolts 34 are then threaded into the threaded holes 32 in the limit bars 30 until they contact the control arm 12 with the forward end of the frame 14 being held so that the control arm 12 is midway between the limit bars 30 as shown in FIG. 3. Lock-nuts 68 are threaded onto the adjusting bolts 34 so that they are positioned as shown in FIG. 2 for engagement with the limit bars 30 to lock the control arm 12 in position relative to the traction bar frame 14.

Thereafter, the nut 66 is tightened onto the rear mounting bolt 64 to cause the toothed washers 62 to grip the rear, lower control arm mounting bracket 54 to substantially prevent relative movement of the frame 14 with respect to the rear bracket 54. Additionally, the outside of each of the frame plates 20 may be roughened or toothed about the upper holes 26 to further aid in preventing rotation of the frame 14 with respect to the rear bracket 54. If desired, the frame 14 may be welded to the rear, lower control arm bracket 54 to ensure non-rotation of the latter with respect to the frame 14.

In the described condition, the traction bars are ready for track use. To change to a street use condition, it is only necessary to loosen the adjusting bolt locking nuts 68 and back off or remove the adjusting bolts 34 from the control arm 12 to permit the latter to move vertically with respect to the frame 14.

If, after the traction bar 10 has been adjusted as described for track use, it is found that one rear wheel spins, the traction bar 10 on the same side as the spinning wheel can be adjusted to move the control arm 12 from its centered position with respect to the limit bars 30. This is done by jacking up the vehicle on the same side as the spinning wheel, loosening the lower adjusting bolt 34 a few turns and correspondingly tightening the upper adjusting bolt 34 to again engage and lock the control arm 12 in position. This may be repeated if the same wheel still spins and/or the opposite steps may be taken on the other traction bar 10. That is, on the latter, the upper adjusting bolt 34 may be loosened a few turns and the lower adjusting bolt 34 tightened a corresponding number of turns while weight is applied downward on the bumper. In both cases, the effect will be to throw more weight to the spinning wheel.

Figure 6:
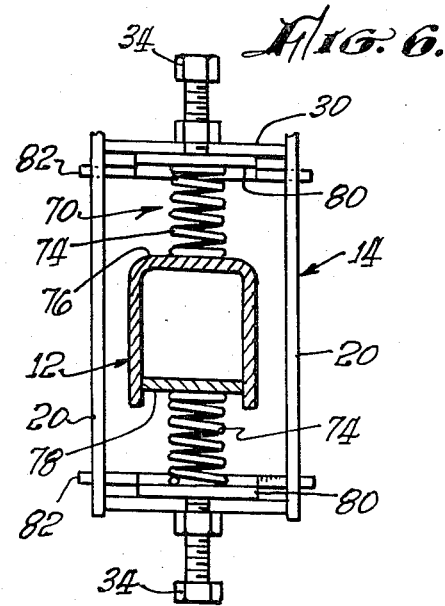
FIG. 6 is a sectional view of the forward end of the frame and related section of the control arm of this invention similar to that of FIG. 2 showing a modified form of the adjustment feature of this invention.

Referring now to FIG. 6, a modification of the adjustment means is shown therein. In brief, this modified adjustment means includes spring biasing means 70 which is carried by the elongated control arm 12 and which extends both above and below the control arm. Adjusting bolts 34 extend through transverse plates 30 mounted on the frame 14 so that they may be brought to bear against the upper and lower or free ends of the spring biasing means 70 when positioning the control arm 12 vertically relative to the frame 14.

Describing this modified adjustment means in more detail, the spring biasing means 70 comprises a pair of resilient, compressible members 74 which may take the form of, for example, metal coil springs (as shown in FIG. 6) or hard rubber plugs. Each spring member 74 is attached at one of its ends to either the upper 76 or lower 78 surface of the control arm 12 so that they extend in opposite directions from each other from the control arm 12 in, preferably, vertical alignment with each other. Attachment of the spring members 74 to the control arm 12 may take various forms including fixed and removeable connection and including welding and adhesive bonding.

In this modification, the transverse plates or limit bars 30 are carried by the frame 14, as previously described, both above and below the free ends of the spring members 74 with or without clearance therebetween. It is presently preferred to employ a bearing plate 80 between each of the spring members 74 and the limit bars 30 to provide a bearing surface against which the adjustment bolts 34 may be brought to bear as they are threaded through the limit bars. The bearing plates 80 may be affixed to the free ends of the spring members 74 or they may take the form of tongues which are carried at their rearward ends on pins 82 extending between and pivotally connected to the vertical side plates 20 of the frame 14 and which extend forwardly thereof between the free ends of the spring members 74 and the adjacent limit bars 30. The forward or free ends of the bearing plates 80 thus are able to rotate about the pivot pins 82.

Adjustment of the control arm 12 relative to the frame 14 in a traction bar incorporating the spring biasing means 70 therein is the same as previously described herein except that the bolts 34 are brought to bear directly or indirectly against the free ends of the spring members 74 rather than against the control arm 12.

The advantage of using this modified adjustment means is that it permits some freedom of movement (vertical) of the control arm 12 relative to the frame 14 while cushioning this movement. In contrast, without the spring biasing means 70, when the traction bar 10 is adjusted for street use as previously described, the control arm 12 is free to bang against the limit bars 30, if they are left in for street use, when the vehicle passes over a bump.

I claim:
1. A traction bar comprising:
a rigid, elongated control arm;
a frame member having a normally rearward and a normally forward end;
first pivot means pivotally connecting said frame member to said control arm adjacent one end thereof and adjacent said rearward end of said frame member to permit vertical pivotal movement of said control arm about said first pivot means relative to said frame member, said forward end of said frame member terminating intermediate the ends of said control arm; and
lockable adjustment means carried on said frame member adjacent said forward end for limiting said vertical pivotal movement of said control arm with respect to said frame member and for locking said control arm in various vertical positions relative to said frame member.

2. The traction bar of claim 1 wherein said adjustment means comprises:
a pair of normally vertically spaced, horizontally oriented bars affixed to said frame member, said bars having threaded, aligned holes extending therethrough; and
normally generally vertically oriented threaded rods sized to be threadably received by said holes in said bars for contact with the normally upper and lower surfaces of said control arm extending therebetween.

3. The traction bar of claim 2 in which said frame member is provided with spaced slots sized to receive said spaced bars and which includes means for releasably retaining said bars in said slots.

4. The traction bar of claim 2 wherein said adjustment means further includes:
spring biasing means attached to, and extending in a normally vertical direction away from, said control arm in vertical alignment with said threaded rods for contact thereby.

5. The traction bar of claim 4 which further includes:

a bearing plate carried on said frame member and extending between each of said spaced bars and said spring biasing means for transmitting force produced by threading said threaded rods against said bearing plates to said spring biasing means.

6. The traction bar of claim 4 wherein said spring biasing means comprises a pair of aligned coil springs with one said coil spring extending from said control arm toward each said spaced bar.

7. The traction bar of claim 4 wherein said spring biasing means comprises a pair of aligned, hard rubber plugs with one of said plugs extending from said control arm toward each of said spaced bars.

8. The traction bar of claim 1 which further includes:

second pivot means for pivotally connecting the other end of said control arm to a vehicle body forward of said vehicle's rear axle for vertical pivotal movement of said control arm with respect to said second pivot means.

9. The traction bar of claim 8 which further includes:

attachment means operably connected to said frame member for fixedly attaching said frame member to said vehicle's rear axle to prevent rotational movement of said frame member with respect to said rear axle.

10. The traction bar of claim 1 in which:
said control arm defines an aperture extending transversely therethrough adjacent each end thereof;
said frame member defines a first hole extending therethrough adjacent said rearward end; and
said first pivot means further includes bolt means extending through said first hole in said frame member and one of said apertures in said control arm.

11. The traction bar of claim 11 in which:

said frame member further defines a second hole extending therethrough adjacent said rearward end and normally above said first hole for receiving bolt means for connecting said frame member to an axle of a vehicle.

12. A traction bar for use in a vehicle suspension system which includes a forward, lower control arm mounting bracket connected to the body of said vehicle and a rear, lower control arm mounting bracket connected to an axle of said vehicle, said traction bar comprising:

a rigid, elongated control arm;

a frame member sized to receive said control arm extending substantially therethrough and having a rearward and a forward end and having an upwardly-facing, concave surface adapted to engage said vehicle axle at said rear, lower control arm bracket;

first pivot means pivotally connecting said frame member to said control arm adjacent one end thereof and adjacent said rearward end of said frame member to permit vertical pivotal movement of said control arm relative to said frame member, said forward end of said frame member terminating intermediate the ends of said control arm;

a pair of limit bars mounted on said frame member adjacent said forward end thereof and extending transversely thereof a spaced distance above and below said control arm for limiting said vertical movement of said control arm relative to said frame member, each said limit bar defining a vertically oriented, threaded aperture extending therethrough;

bolt means threadably receivable by said limit bar apertures for further limiting said vertical movement of said control arm and for vertically positioning said control arm relative to said frame member;

second pivot means for pivotally connecting the other end of said control arm to said forward, lower control arm mounting bracket; and attachment means for fixedly connecting said frame member adjacent said rearward end at a point above said first pivot means to said rear, lower control arm bracket.

13. The traction bar of claim 12 which further includes:

spring biasing means mounted on said control arm and extending therefrom toward each said limit bar in vertical alignment with said bolt means; and bearing plate means pivotally mounted on said frame member and interposed between said spring biasing means and each said limit bar, said bearing plate means bearing against said spring biasing means when said bolt means are threaded thereagainst.

* * * * *